Oct. 31, 1967     P. S. TAYLOR     3,350,221
PROCESS FOR MAKING FILTER-SHEET MATERIAL
Filed Feb. 6, 1964
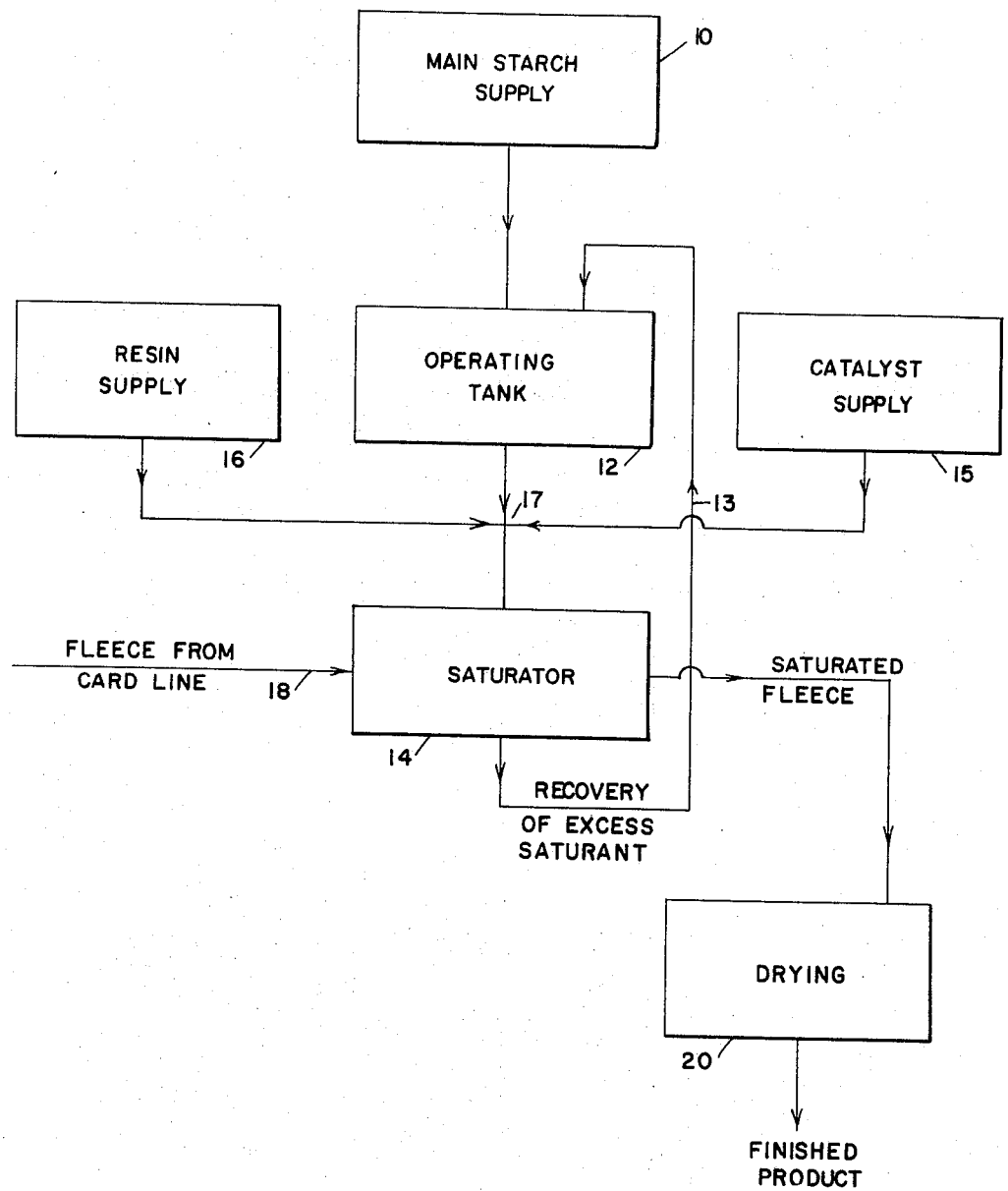

United States Patent Office 3,350,221
Patented Oct. 31, 1967

3,350,221
PROCESS FOR MAKING FILTER-SHEET MATERIAL
Philip S. Taylor, Walpole, Mass., assignor to The Kendall Company, Boston, Mass., a corporation of Massachusetts
Filed Feb. 6, 1964, Ser. No. 343,015
2 Claims. (Cl. 117—140)

ABSTRACT OF THE DISCLOSURE

Combinations of unmodified starch with a cross-linking resin and a catalyst are desirable as bonding agents, but have limited "pot life" in that gelation occurs on standing. This is avoided by combining starch, resin, and catalyst at the point of use—i.e., at the saturator—and by recovering excess saturant which is returned to the system at a point intermediate between the main starch supply and the saturator.

---

This invention relates to milk filter-sheet material comprising fibrous webs bonded with a starch binder of high amylose content. More particularly it relates to an improved process for producing such filter material in which the starch is cross-linked to a relatively water-insoluble state without the difficulties of gelling and viscosity increases usually attendant on such processes.

The drawing is a simplified flow sheet of the method.

By milk filter-sheet material is meant a fleece or batt of intermingled textile-length fibers, such as the product from a set of cards, garnetts, air-lay machines, or the like. Such fibrous fleeces, bonded with a binding agent to impart proper handling properties and a degree of wet strength during use, are widely used in the dairy and food processing field to remove sediment from a variety of fluids, having largely replaced the historically earlier pieces of flannel used for such purposes.

Originally and for some time such fibrous pads were bonded with starches or natural gums, which, although water-sensitive, had the advantage of being acceptable in connection with the processing of edible products because of their recognized innocuous nature. The nature of such starches and gums, however, is such that they soften and lose their binding capacity when wet with aqueous fluids, so that the fibers comprising the filter are readily disarranged out of their intermingled formation, thin places develop, and filtration efficiency is impaired. Modern filter media of this type are therefore bonded with latices, emulsions, or solutions of synthetic binders such as polyvinyl alcohol, polyvinyl acetate, and the like. Media bonded with synthetic binders are more "wash-resistant": that is, they maintain the integrity of the fibrous sheet under the influence of turbulent fluid flow. They have, however, created problems inasmuch as commercially available synthetic binders should, under current regulations, be thoroughly tested to establish their short-term and long-term acceptability in contact with foodstuffs. Commercial binder formulations may contain various combinations of surfactants, emulsifying agents, stabilizers or thickeners, catalysts, anti-oxidants, and other ingredients in addition to the basic polymer or polymers. Even minor changes in such complicated formulations involve retesting and reappraisal of the acceptability of the formula.

It would be advantageous, therefore, to utilize as a binder for such filter media a material which possessed the acceptable status of starch, but free of the water-sensitivity and low bonding power when wet which makes the use of starch undesirable. It is with such a binder that the present invention is concerned.

It is an object of this invention to produce a fibrous filter medium suitable for the processing of foodstuffs in which the bonding agent is a starch fraction of low water-sensitivity.

It is a further object of this invention to produce such a fibrous filter medium in which the starch fraction is further insolubilized by means of a cross-linking agent.

Other objects of the invention will be apparent from the specification and flow sheet thereof. Ordinary starch of commerce comprises two species of carbohydrate material. One species, the amylose fraction, has a lower degree of swelling in water than the second, or amylopectin, fraction.

In general, the amylopectin fraction is highly branched: the ready accessibility of its hydroxyl groups to water renders it readily water-swellable, and since it is the major constituent of the regular starch of commerce, such starch may be dispersed in water by heating to 90°–100° C. The amylose fraction of starch, normally 30% or less of the content of a conventional starch, is substantially linear in configuration, the hydroxyl groups are less accessible to water, and this amylose fraction per se cannot be dispersed in boiling water at 100° C. In ordinary starch of dominant amylopectin content, the water sensitivity of the amylopectin fraction unfortunately prevents such starch from applications such as a binder for milk filters, wherein high wet strength and wet integrity are essential.

Refined starches are now available which contains a relatively high amylose content, up to 50 or even 70% amylose, in contrast to natural starch which has about 30% amylose. When used alone as a binder for non-woven fabrics intended for the filtration of aqueous fluids, however, even such "improved" starches do not have the high degree of wet strength possessed by man-made synthetic polymeric latices such as the acrylic latices, or polyvinyl acetate emulsions. It has been my general experience that for resistance to "washing" and fiber distortion which are accompanied by inefficient filtration, a bonded fibrous filter sheet should have a wet-strength value of at least 0.6 pound per inch-wide strip. This strength value is measured by immersing one-inch wide strips of a bonded non-woven filter medium in water at room temperature for at least one minute to insure thorough wetting, and then testing the tensile strength of the thoroughly wet strips. Commercially acceptable fibrous filter media show a wet strength of about 0.9 pound per inch-wide strips. Comparable strips bonded with a refined starch of 70% amylose content have a wet strength of about 0.2 pound per inch-wide strip.

I have found that it is possible to increase the tensile strength of non-woven filter fabrics bonded with a starch of 50% to 70% amylose content by the addition to the binder of a cross-linking agent, such as melamine formaldehyde in a low-polymeric or uncured state. Presumably the melamine formaldehyde during the drying and curing process reacts with the hydroxyl groups of the amylose, to reduce still further the swelling and water-sensitivity of the amylose fraction of the refined starch binder. Whatever the reason, I have found that the addition of, for example, 5% to 10% of a 20% solution of melamine formaldehyde, plus a small amount of magnesium chloride as catalyst to a solution of refined starch of 70% amylose content will raise the wet-strength of non-woven fabrics bonded with such a mixture to a level which makes them acceptable for use in the filtration of aqueous fluids.

The use of a high-amylose starch in a feasible commercial process of producing bonded non-woven fabrics for milk filter use requires a rather thorough penetration and saturation of a fibrous web weighing about 60 grams per square yard, in order to meet acceptable commercial standards of performance. Dispersions of high-amylose starch have a tendency to gel unless they are kept at an elevated temperature, as at 100° F. or higher. In the gel state, penetration of the fibrous web is impossible, and gelled starch pastes due to their high viscosity are not satisfactory for use as binders for non-woven fabrics. As a working index, I have found that starch dispersions should be kept at a fluidity of not more than 40 centipoises, as measured by a Brookfield viscosimeter, in order to bond satisfactorily a web of fibers intended for use as a bonded non-woven filter fabric.

Unfortunately, the addition of cross-linking agents such as melamine-formaldehyde will, I have found, accelerate the tendency of high-amylose starch solutions to gel, particularly at the high temperatures at which such starch dispersions must be kept for satisfactory continuous processing on a commercial scale. This is especially true if an acidic catalyst, such as magnesium chloride, is used to promote the cross-linking reaction between the melamine formaldehyde and the starch.

In order to test the effect of melamine formaldehyde and catalyst on the starch fluidity, a suspension was made of 120 parts of a high-amylose starch and 1,000 parts of water. The starch is known commercially as Amylon VII, produced by National Starch Corporation, has an amylose content of about 70%, and has a suitable viscosity for the purposes of this invention when used in a concentration of from 5% to 15% starch content. Dispersion was effected by passing the starch suspension through a continuous high-pressure steam cooker where the instantaneous temperature was about 320° F. As the cooked starch left the cooker it was quenched with cold water to a temperature of about 180° F. and a concentration of 76 parts of starch per 1,000 parts of water.

One portion of this starch dispersion was reserved without treatment. To another portion there was added 0.2 part (solids basis) of melamine formaldehyde resin per part of starch, the resin being in the form of a commercially available product known as Aerotex M3, a product of American Cyanamid. To another portion of starch a similar amount of M3 resin was added, together with .028 part of magnesium chloride catalyst per part of resin. All three samples were generally kept at a temperature of between 130° F. and 180° F., which is a satisfactory operating temperature for maintaining the viscosity of such starch dispersions at a value low enough to allow satisfactory penetration and saturation of fibrous fleeces. The viscosity of the three samples was measured periodically with the No. 1 spindle of a Brookfield viscosimeter at 60 r.p.m. The viscosity measurements were as follows:

| Elapsed Time, min. | Starch Alone | | Starch plus Resin | | Starch plus Resin and Catalyst | |
|---|---|---|---|---|---|---|
| | T., °F. | Viscosity, cps. | T., °F. | Viscosity, cps. | T., °F. | Viscosity, cps. |
| 0 | 178 | 19 | 180 | 13.5 | 180 | 14.5 |
| 105 | 150 | 27.5 | 150 | 44.0 | 196 | Gelled |
| 135 | 170 | 22.5 | 168 | 40.5 | | |
| 165 | 180 | 19.0 | 184 | 48.0 | | |
| 195 | 150 | 19.0 | 150 | 86.0 | | |
| 225 | 140 | 22.0 | 140 | 100 | | |
| 255 | 130 | 25.0 | 130 | 100 | | |

As evidenced by the above measurements, the fluidity of an amylose starch dispersion can be maintained below 30 centipoises at temperatures of 130°–180° F. for several hours, thus allowing the preparation and utilization of large batches of such dispersions with no deterioration in quality. In the presence of a resinous cross-linking agent such as melamine formaldehyde, however, there is a steady increase in viscosity with time, so that saturation and penetration of fibrous fleeces is accomplished with difficulty, the product is liable to be unevenly bonded, and the flow of binding fluid through the distributing system becomes sluggish and erratic. This undesirable effect is even more pronounced when the resin addition is coupled with the addition of an acidic catalyst such as magnesium chloride, the presence of which is desirable in effecting a more thorough cross-linking of resin and starch and consequently in effecting a higher degree of wet-strength in the final product. In less than two hours the effect of the magnesium chloride has caused the starch solution to set to an unworkable gel, even at 196° F.

I have found that the undesirable effects of resin catalyst addition to amylose starch dispersions may be circumvented by a process wherein the resin-catalyst mixture is combined with the amylose starch dispersion approximately at the point where the latter is fed to the saturator. The process will be more readily understood by reference to the flow diagram, in which 10 represents a storage tank, conveniently of at least 1,000 gallons capacity, heated to maintain the starch solution at a temperature preferably 130° F. or higher.

This main starch tank may be a pressure vessel in which a large batch of starch is prepared at one time for batch operation, or it may be continuously fed from a conventional pressure cooker of smaller capacity, not shown.

From the main tank an amylose starch dispersion flows to a so-called "operating tank" 12 conveniently of 50–70 gallons capacity, and also heated to keep the dispersion fluid. Thence the starch dispersion flows to the saturator 14, which may be a pair of nip-rolls and a trough, a double-screen saturator, or other conventional type. Just prior to the point at which the starch dispersion enters the saturator, the appropriate amounts of aqueous solutions of resin and catalyst are separately metered from the resin supply source 16 and the catalyst supply source 15 into the flow line as at the point 17. The turbulent flow in the starch feed line, together with the mixing action involved in the saturation step, are usually sufficient to effect an intimate blend of starch dispersion with the resin solution and the catalyst solution.

An appropriate fibrous fleece 18, from the desired type of fiber arranging equipment, is fed into the saturator where it is impregnated with the mixture of amylose starch plus resin and catalyst. Thence the fleece is conveyed to a drying process 20, which may be dry cans, a tunnel dryer, or any chosen means.

The adjustment of the proper pickup of saturant in the saturating sttp customarily involves slight oversaturation of the fleece with a subsequent removal of excess saturant to maintain a controlled percentage of binder in the final product. This adjustment is made through the use of squeeze-rolls, vacuum boxes, or the like. I have found that in a process of this sort it is convenient to oversaturate by 10% to 20%, recovering the excess saturant as shown and returning it by the line 13 to the operating tank 12.

In this manner, only a small amount of resin and catalyst are returned to the system, and since they are returned at an intermediate stage 12, into which a constant supply of fresh uncontaminated starch dispersion is being fed, the resin-catalyst concentration never reaches such a point that the binder dispersion becomes too viscous to allow an even and uniform production of a bonded fibrous fleece. This allows production to be maintained on a continuous basis, with all of the known advantages concomitant therewith.

Having thus described my invention, I claim:

1. The method of producing a bonded fibrous filter-sheet material which comprises:
   preparing a web-like fleece of intermingled, unspun textile-length fibers,
   preparing an aqueous dispersion of a starch having an amylose-content of from 50% to 70% in a first container, this dispersion having from 5% to 15% of starch, continuously feeding said dispersion into a second container,
continuously feeding said dispersion from said second container to a web-saturating device,
simultaneously feeding to said saturating device a solution of a cross-linking agent capable of reacting with the hydroxyl groups of the amylose,
also simultaneously feeding to said saturating device a solution of a catalyst capable of promoting the reaction between the cross-linking agent and the amylose,
continuously saturating said fibrous fleece with the mixture of said starch dispersion, said resin solution, and said catalyst solution,
continuously removing excess saturant from said fleece and returning said excess to said second container,
and continuously removing said saturated fleece from said web-saturating device and drying said fleece.

2. The process according to claim 1 wherein the cross-linking agent is melamine formaldehyde, and the catalyst is magnesium chloride.

References Cited

UNITED STATES PATENTS

| | | | |
|---|---|---|---|
| 2,738,074 | 3/1956 | Valente | 117—156 X |
| 3,024,212 | 3/1962 | Paschall et al. | 117—156 X |
| 3,117,021 | 1/1964 | Klug | 117—165 X |
| 3,119,715 | 1/1964 | Reeves et al. | 117—139.4 X |
| 3,122,534 | 2/1964 | Muetgeert et al. | 117—156 X |
| 3,188,232 | 6/1965 | Gruber et al. | 117—139.4 |

OTHER REFERENCES

Taft, P.B.: The Use of Urea-Formaldehyde Resin for Waterproofing Starch Used in Corrugated and Solid Fiberboard Production, Oct. 15, 1942, Paper Trade Journal, pp. 30–32.

Senti, F.R., and Russell, C.R.: High-Amylose Cornstarch—Properties and Prospects, June 16, 1960, reprinted from TAPPI, vol. 43, No. 4, April 1960, pp. 343–349.

WILLIAM D. MARTIN, *Primary Examiner.*

M. LUSIGNAN, *Assistant Examiner.*